(12) United States Patent
Sonu

(10) Patent No.: US 7,515,517 B2
(45) Date of Patent: Apr. 7, 2009

(54) METHOD AND APPARATUS FOR DATA DETECTION IN BLUE LASER OPTICAL DISK DRIVES

(75) Inventor: Gene Ho Sonu, San Jose, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 663 days.

(21) Appl. No.: 10/836,607

(22) Filed: Apr. 30, 2004

(65) Prior Publication Data

US 2004/0246859 A1 Dec. 9, 2004

Related U.S. Application Data

(60) Provisional application No. 60/466,756, filed on Apr. 30, 2003.

(51) Int. Cl.
*G11B 7/00* (2006.01)
(52) U.S. Cl. .................................. 369/53.31; 369/59.21
(58) Field of Classification Search ............... 369/59.22
See application file for complete search history.

(56) References Cited

U.S. PATENT DOCUMENTS

| | | | | |
|---|---|---|---|---|
| 4,328,580 A | * | 5/1982 | Stockham et al. | 714/710 |
| 5,282,216 A | * | 1/1994 | Patel et al. | 369/59.22 |
| 6,233,714 B1 | * | 5/2001 | Hassner et al. | 714/794 |
| 6,278,304 B1 | * | 8/2001 | Livezey | 327/157 |
| 6,493,162 B1 | * | 12/2002 | Fredrickson | 360/51 |
| 6,711,106 B2 | * | 3/2004 | Sasaki | 369/47.28 |
| 6,807,137 B2 | * | 10/2004 | Chuang | 369/59.24 |
| 2004/0170104 A1 | * | 9/2004 | Emest | 369/59.24 |

* cited by examiner

*Primary Examiner*—Wayne R Young
*Assistant Examiner*—Van N Chow
(74) *Attorney, Agent, or Firm*—Marger Johnson & McCollom, P.C.

(57) ABSTRACT

A method and apparatus in an optical disk system employing a look-ahead data detection technique is described where an optimum detection is achieved with a minimum hardware complexity. In one embodiment, the boundary functions and the corresponding boundary decisions are derived for next state determination using only the minimum distance event pair for each state over the look-ahead samples, thereby reducing the detector hardware significantly relative to the Viterbi counterpart where the most likely occurring path is searched at every state. Depending on the sample quality, the limits for the boundary decisions can be programmable to combat the channel impairments like misequalzation, signal asymmetry, etc.

9 Claims, 26 Drawing Sheets

Figure 5b
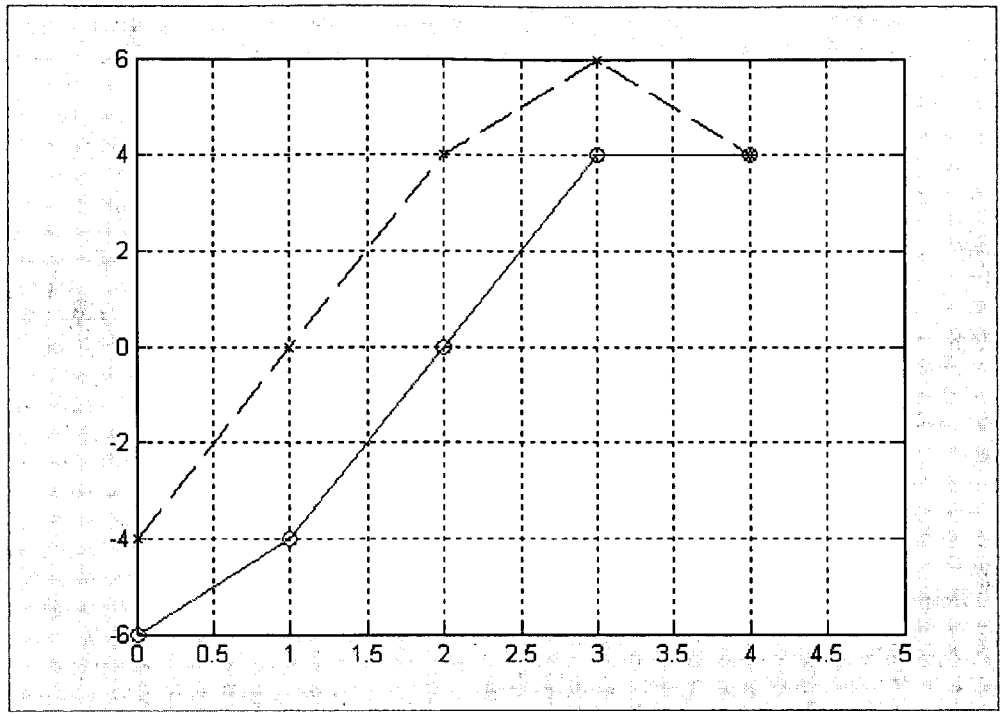
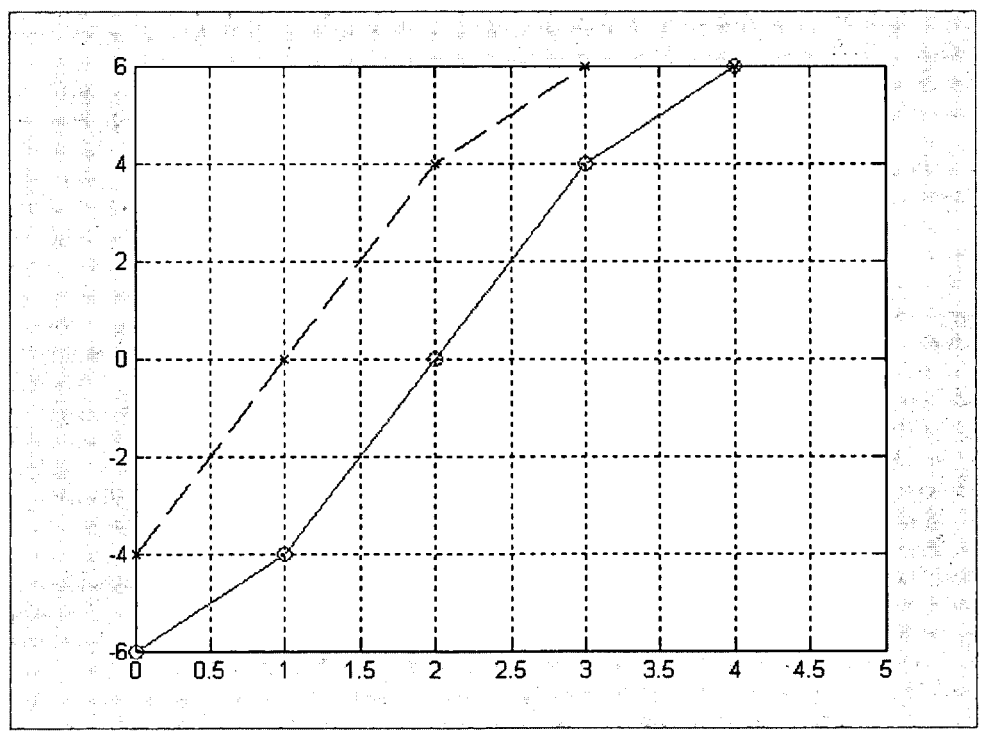
Figure 5c

METHOD AND APPARATUS FOR DATA DETECTION IN BLUE LASER OPTICAL DISK DRIVES

This application is a continuation of and claims priority from U.S. Provisional Application 60/466,756, filed Apr. 30, 2003, which is herein incorporated by reference in its entirety.

BACKGROUND OF THE INVENTION

1. Field of the Invention

The invention relates generally to disk drive systems using blue laser diodes, and specifically to optical disk drive circuitry for improving data detection.

2. Background of the invention

Over the past decade, there has been a tremendous shift in portable storage from magnetic "floppy" disks to optical disks such as compact discs (CDs) and digital versatile discs (DVDs). The advantages of optical discs over their magnetic counterpart are numerous, including the ability to store an enormous amount of data, making it ideal for storing large files and programs, music, movies, etc.

An important consideration in optical disk drives, and really all disk drives, is the access time, which is directly related to how fast the disk spins. That is, as the disk spins faster, the access time for reading and/or writing data is reduced. There has been much effort, in terms of time and money, in reducing the access times for optical disk drives.

Data is stored on an optical disk in the form of microscopic pits and lands, which separate neighboring pits, referred to as marks and space in DVDs, which separate neighboring pits. As the disk spins, pits and lands pass under a laser beam and reflect the laser beam at varying intensities. The reflected laser beam is detected by an optical pick-up unit (OPU) and, in response thereto, produces a stream of "1's" and "0's" representing a "pick-up" signal.

As optical disk drive speeds continue to increase, the components in optical disk drives such as the OPU and media become more band-limited. As a result, the OPU "pick-up" signal suffers resolution loss. Resolution may be defined as the ratio between the maximum and minimum peaks in the "pick-up" signal. For example, it has been observed in at least one commercial blue laser DVD drive that the signal resolution is around 10%, as a result of pushing the a real density to achieve 30 Gbyte capacity required for HDTV application.

Optical disk drives typically employ an equalizer to boost the resolution of the "pick-up" signal. In at least one application, the minimum resolution required to detect the smallest mark is found to be about 50%, which means that the equalizer boost may have to be as big as 14 dB (=20 $\log_{10}$(50%/10%)). To achieve a signal resolution of about 50% at a data slicer input, it has been determined that the modular transfer function (MTF) as expressed below in equation (1) provides good equalization.

$$H(D) = a + bD + cD^2. \tag{1}$$

where a=1, b=2 and c=1.

This will be referred to as PR121.

However, by boosting the "pick-up" signal, the equalizer is also boosting the noise at the data slicer input, thereby degrading the data slicer performance.

One method for boosting the resolution of the "pick-up" signal while attempting to minimize noise includes employing a Partial Response Maximum Likelihood (PRML) technique. The PRML utilizes a Finite Impulse Response (FIR) digital filter and a Viterbi Detector (VD). The PRML technique provides reliable detection in the sense of the least mean squared error technique. One drawback of this technique, however, is the hardware complexity resulting from the speed limitation imposed by the required Add-Compare-Select ("ACS") operation and the path memory length required for the algorithm convergence.

SUMMARY OF THE INVENTION

According to one aspect of the invention a set of look-ahead samples are used.

According to another aspect of the invention, the paths associated with most likely error events are predetermined prior to implementation, resulting in a significant reduction in hardware.

According to another aspect of the invention, the branch metrics for each path in the most likely error events can be measured in terms of the absolute error term instead of the conventional squared error terms to reduce the hardware complexity.

According to another aspect of the invention, the branch metrics for each path in the most likely error events can be measured using target sample values as variables rather than fixed where the target values are adaptively determined from statistics of each variable. In such design, the boundary limits will be adaptively adjusted such that the effects of both linear and nonlinear channel impairments like misequalization, asymmetry due to non-ideal write process, etc. can be compensated for.

According to another aspect of the invention, the boundary function generator can be implemented using radix-3, -4 or any order trellis using divided clocks instead of the channel clock for a possible gate count reduction by sharing same primitive branch metric terms as many as possible among the parallel blocks in such boundary function generator.

According to another aspect of the invention, the boundary decision limits can be adaptively set for asymmetry correction using actual sample distributions, which result in target sample amplitudes for a given PR system.

According to another aspect of the invention, the rms error is generated in real time to monitor the quality of the decoding process.

DETAILED DESCRIPTION OF PREFERRED EMBODIMENTS

Disclosed herein is a method and apparatus utilized in an optical disk system with blue laser diode that employs a look-ahead detection technique. In order to minimize the hardware complexity, only the look-ahead sample sequences contributing to most-likely occurring error events are considered to derive the respective decision boundaries.

Due to the simplified hardware architecture of the embodiments of the invention, it is possible to minimize high-frequency noise boost by reducing equalization requirement. This allows for a more reliable detection of the signal from the noise.

As background information to the invention at hand, an exemplary digital playback system is described which incorporates one or more embodiments disclosed herein. The digital playback system allows playback of optical disks such as compact discs (CDs) and digital video or versatile discs (DVDs), which may include data, audio, video, and combinations thereof.

The digital playback system includes an optical disc, an optical disc motor that rotates the optical disc, servo drivers that control the speed of the disc motor, and an optical pickup unit (OPU) that senses information stored on the optical disc and generates a signal in response thereto. In the case of CDs, the information stored on the optical disc is in the form of pits. The OPU includes circuitry, for this invention a blue laser for recording and sensing the pits on the optical disc. The arrangement of pits on CDs is different from the arrangement of marks on DVDs. Consequently, the OPU is capable of sensing different arrangements of pits and marks on the optical disc. It is contemplated that the digital playback system may include more than one optical disc.

Figure 1:
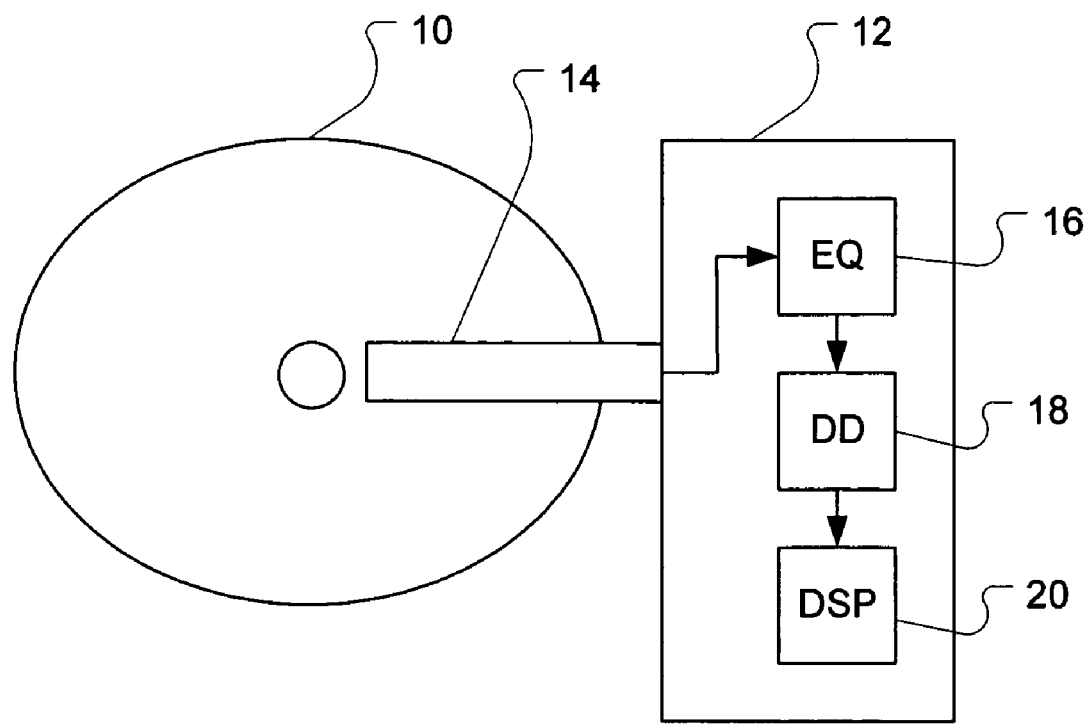
FIG. 1 shows an embodiment of an optical disk reader.

An embodiment of a system using an OPU is shown in FIG. 1. A disc 10 is read by a laser diode mounted in the arm 14. The OPU then detects the light reflected from the disc into a read channel 12. The OPU is coupled to a read channel 12 and provides the pick up signal to the read channel. In one embodiment, the pick up signal is an analog signal. The read channel 12 includes an equalizer 16, a data slicer detector, and a clock recovery block not shown. The clock recovery block is typically a Phase Lock Loop (PLL) that recovers a clock signal from the pick up signal. The recovered clock signal is transmitted to the data detector 18. The equalizer 16 boosts the pickup signal while minimizing noise and the data detector 18 detects signal transitions containing the transmitted data and generates a digital data stream. The output of the data detector 18 is coupled to a digital signal processor (DSP) 20 that, among other things, provides signal processing functionality. The DSP can process the signal into different formats such as formats compatible with CDs and DVDs. More specifically, for DVDs, the DSP may provide synchronization, 16-to-8 demodulation (and other demodulation) of DVD data, error correction code (ECC) error correction, descrambling, error detection code (EDC) and ID error detection (IED) detection, authentication for encryption techniques such as Content Scrambling System, Content Protection for Pre-recorded Media, Content Protection for Recorded Media, and buffer management. For CDs, the DSP may provide analog to digital conversion, demodulation (e.g., Eight-to-Fourteen "EFM" demodulation), and error correction. The DSP also provides memory resources for facilitating signal processing functionality. In one embodiment, the read channel is implemented on a single integrated circuit. In another embodiment, the read channel and DSP are implemented on a single integrated circuit.

Additionally, the DSP includes servo and disc motor control functionality. In particular, the DSP recognizes errors in the pick-up signal, generates error signals in response thereto, and transmits the error signals to the servo drivers. Examples of error signals include spindle motor control, optical pickup, focus, and tracking (of OPU). The DSP calculates servo error control signals, which typically include a focus error signal, tracking error signal, and a track-crossing pulse signal. The DSP may calculate several closed-loop servos, including a disc motor servo, focus servo, and tracking servo. Based on the servo error control signals, the DSP outputs control voltages to the servo drivers to correct the rotation speed, to move the sled which houses the OPU to the proper track, to move up or down the OPU to a proper distance from the disc, or to correct the off-track error. It is contemplated that servo and disc motor control functionality may be implemented external to the DSP.

The DSP further provides an interface to an MPEG (Moving Pictures Experts Group) decoder. The digital output stream outputted from the DSP to the MPEG decoder may be in one of a number of formats including, but not limited to, compact disc digital audio (CD-DA) data, as defined by the Red Book standard, compact disc read-only memory (CD-ROM) data, as defined by the Yellow Book standard, or an MPEG program stream. The DSP handles CD/DVD bit streams, including support of special effects. The MPEG decoder is coupled to a memory, a video playback subsystem, and an audio playback subsystem.

The MPEG decoder decodes the data stream received from the DSP, converts it into video data and/or audio data, in one of a number of selected formats, for output to video and audio subsystems, respectively. In one embodiment, the MPEG decoder is an MPEG-II decoder that receives an MPEG-II data stream from the DSP and converts the data stream into digital audio and video outputs. The MPEG decoder extracts timing information from the MPEG data stream, and de-multiplexes the compressed MPEG data stream into decompressed audio and video data streams. The MPEG decoder generally includes a MPEG audio decoder, which decompresses and decodes the compressed MPEG audio stream to produce a decompressed audio data stream, and a MPEG video decoder that decompresses and decodes the compressed MPEG video data stream to produce a decompressed video data stream. The decompressed video and audio streams may then be forwarded to video and audio playback subsystems for playback. The timing information extracted by the MPEG decoder is used to synchronize the audio and video outputs. The optional memory provides memory resources for the decoding process.

Coupled to the DSP, MPEG decoder, and other devices is a microcontroller for controlling the operation of the digital playback system. It is to be appreciated that a microprocessor, gate array, or other device(s) may be used instead of the microcontroller as the central processing unit of the digital playback system. The microcontroller may be coupled to volatile memory (and/or internal volatile memory, not shown) for executing instructions, storing data and variables, etc. A non-volatile memory such as a read-only memory (ROM), Flash memory, or any memory that does not lose its signal upon loss of power, stores program code for execution by the microcontroller to control operation of the digital playback system. The program code, stored in non-volatile memory, may be loaded into volatile memory at startup for execution by microcontroller. The microcontroller may also be coupled to a CPU (not shown) of the entire system in which digital playback system is implemented for communication therewith.

Figure 2:
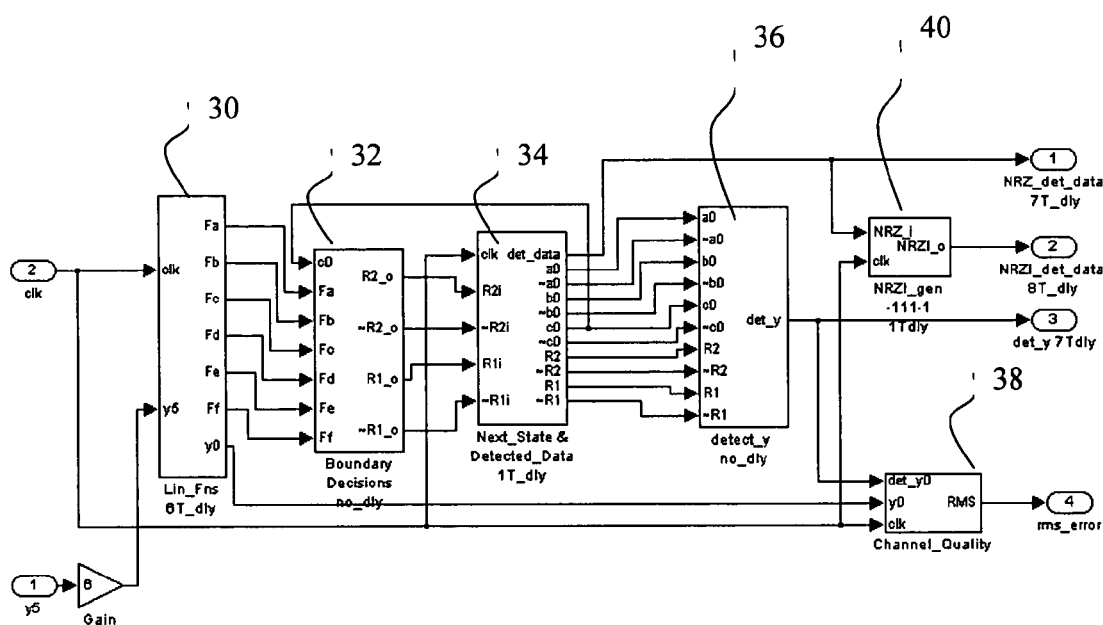
FIG. 2 shows a schematic diagram of one embodiment for the invention.

FIG. 2 is a block diagram of a look-ahead detector 18 of FIG. 1 according to one embodiment of the present disclosure. The linear boundary function generator 30 generates functions used to determine the boundaries as will be discussed further. It receives as its inputs the clock signal and the sampled detection signals, y. In this embodiment, 5 samples are taken from the detector. It must be noted that 5 samples are just an example and any number of samples may be used in a particular system depending on the characteristics of channel impairments present in the system The function generator 30 generates the output functions Fa, Fb, Fc, Fd, Fe and Ff, as will be discussed with regard to Tables 2 and 3.

The output functions Fa-Ff and a feedback function for one of the values of the detected state, c0, are used as inputs to the boundary decision module 32. The boundary decision module 32 takes the boundary functions and uses them to output boundary decisions R1 and R2, as discussed below with regard to Tables 2 and 3. The boundary decisions R1 and R2 as well as their inverses are output to the next state detector 34.

The next state detector then decodes the output and produces a detected data signal det-dat and the three bits of the next state, a0, b0 and c0, as will be discussed further with regard to Table 4. The values of the bits a0, b0 and c0 and their inverses, are then sent to the sample value estimator 36. The decision outputs R1 and R2 are also provided. The sample value estimator then determines the sample value yO and produces that as an output det_y. The detected bit, metadata from 34 s provided to a non-return-to-zero (NRZ) module 40 that outputs the signal as a particular voltage level to indicate a 1 or 0 state. The value of the output duty is provided to an rms error module 38 that compares the initial sample value generated by the function generator 30 and the detected sample provided by the sample value detector 36 to determine any error.

Figure 3:
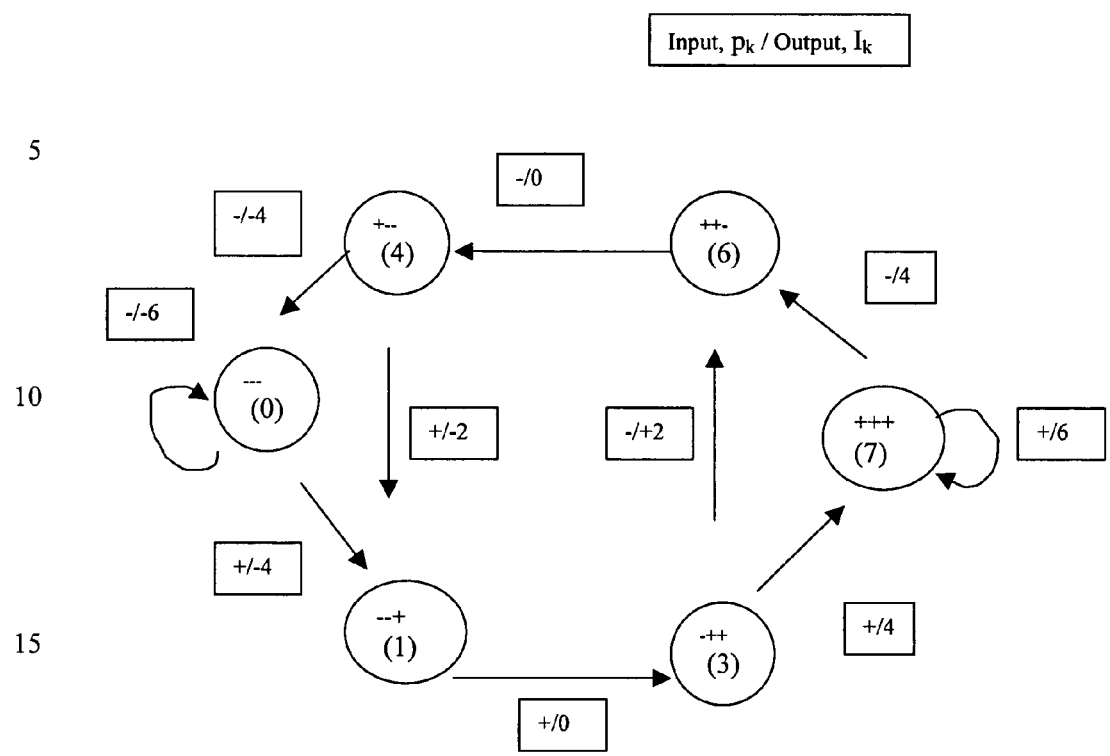
FIG. 3 shows a state diagram for one embodiment of a detector.

The various decisions and function of the invention can be described as a finite state machine (FSM) whose structure is based on the state diagram in FIG. 3. In this diagram, the polynomial for the MTF is chosen to be PR1221. As seen in FIG. 3, there exist only 6 states out of 8 possible states due to (1, 7) encoding constraint. In this diagram, the state, s, is defined as:

$s_k = (p_{k-3}, p_{k-2}, P_{k-1})$ and the output is defined as: $I_k = (p_k + 2p_{k-1} + 2 p_{k-2} + p_{k-3})$ where $p_k$ is input symbol, $\{+1, -1\}$.

In FIG. 3, it can be readily seen that the left and right halves constitute the image of each other in terms of the state and the branch. For example, the state 0 in decimal has the image state of 7 in decimal, etc. The branch from state 0 to 0 is the image of the branch from 7 to 7, etc. In addition, the left half represents the positive transition while the right half represents the negative transition. The property mentioned here will be explored to derive the boundary functions as well as to reduce the hardware complexity.

Figure 4:
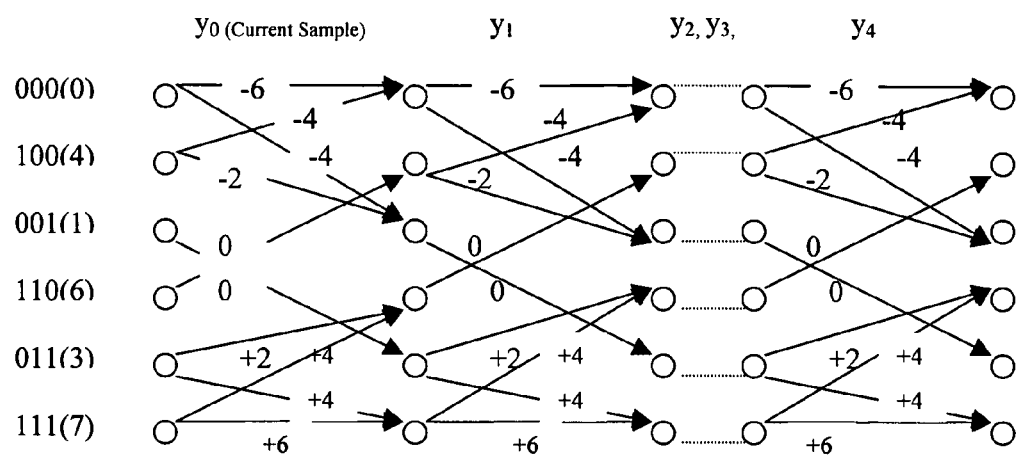
FIG. 4 shows a trellis diagram for the detector of FIG. 2.

In FIG. 4, a trellis is drawn over 5 samples, $y_0, y_1, y_2, y_3$ and $y_4$ and there exist four states where decisions are required to move to the respective next states. For example, the state 0 in decimal has two branches arriving at state 0 and state 1 at next sample time. As previously mentioned, there exists symmetry property among these four states. For example, the states 0, 4 and 6 are the images of states 7, 3 and 1, respectively. Such symmetry property can be explored to reduce the hardware complexity such that the decision circuits used for states 0 and 4 can be readily reused for states 7 and 3, respectively just by inverting the signs of the samples involved in the process without duplicating the same hardware as would be seen as in the subsequent sections.

First, since the state 0 branches out to either state 0 or 1, decision has to be made which branch should be taken given a current sample, $y_0$. All the paths via state 0 are grouped as P group while all the paths via state 1 is grouped as Q group.

Table 1 shows Euclidian distance squared between a pair of all possible permutations of P and Q groups.

TABLE 1

Euclidian Distance Squared for State 000 (0).

|    | Q1  | Q2  | Q3  | Q4  | Q5  |
|----|-----|-----|-----|-----|-----|
| P1 | 144 | 156 | 276 | 384 | 428 |
| P2 | 140 | 144 | 256 | 348 | 384 |
| P3 | 136 | 124 | 204 | 256 | 276 |
| P4 | 112 | 92' | 124 | 144 | 156 |
| P5 | 140 | 112 | 136 | 140 | 144 |
| P6 | 44  | 32  | 40  | 68  | 88  |
| P7 | 104 | 76  | 52  | 40  | 44  |
| P8 | 140 | 104 | 72  | 44  | 40  |

In Table 1, six entries are highlighted in bold because only these pairs of sequences are considered to derive decision boundaries. The pair of P6 and Q2 has the minimum distance of 32. This pair represents a transition shift error in di-bit pattern. It is noticed from simulation in the following that the di-bit error rate can be reduced by taking more look-ahead samples than five as in one embodiment described here.

It is mentioned that among six pairs, there are three pairs with the distance of 40. They are P7-Q4, P8-Q5 and P6-Q3. If P7 sample sequence is received, it is only necessary to check against P4 path from Q group because Q4 is the path closest to P7 among Q group. The similar argument can be made for P8 and P6.

In FIGS. 5a-5d, the four pairs mentioned above are plotted as follows:

P group represents all the paths starting at (000) and pass via state (000) at next clock. Q group represents all the paths starting at (000) and pass via state (001) at next clock.

Figure 5A:
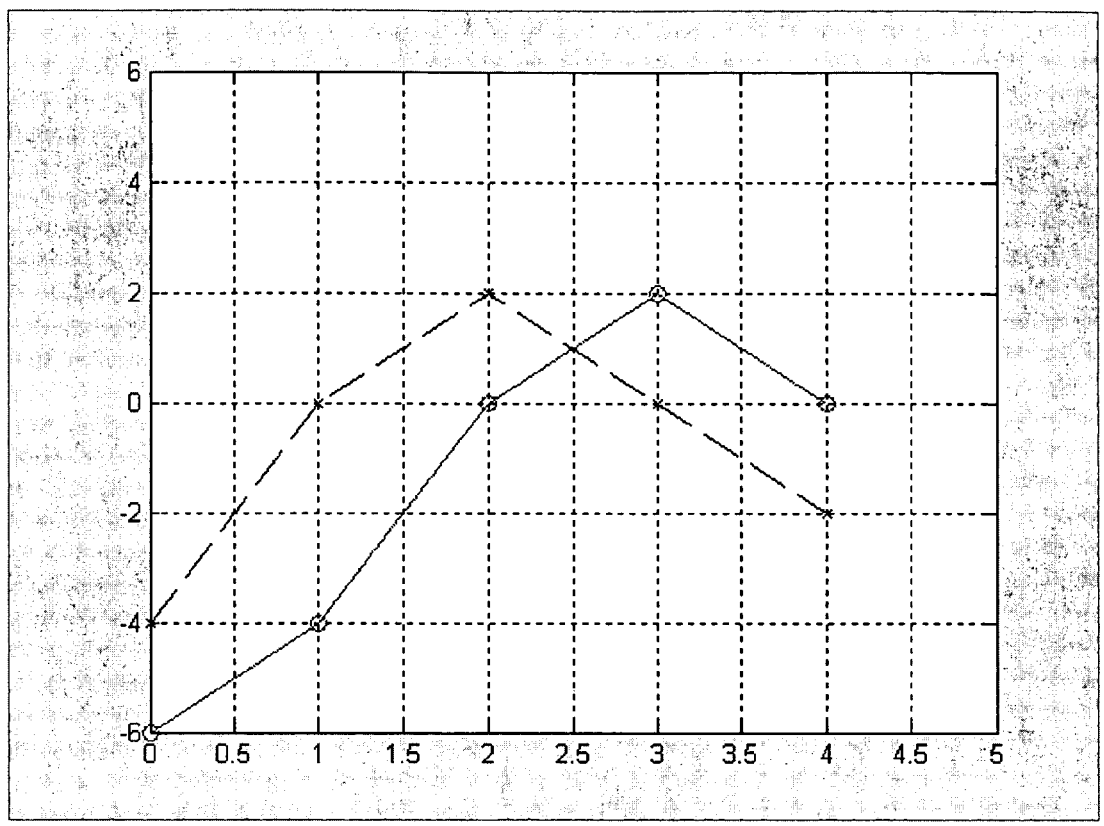
FIG. 5 shows graphs of plots of minimum distance for a zero state of the detector.

FIG. 5a: P6 (−6 −4 0 2 0 shown as a circle) and Q2(−4 0 2 0 −2 shown as a asterisk), Euclidean distance=32

FIG. 5b: P7 (−6 −4 0 4 4 shown as a circle) and Q4 (−4 0 4 6 4 shown as a asterisk), Euclidean distance=40

FIG. 5c: P8 (−6 −4 0 4 6 shown as a circle) and Q5 (−4 0 4 6 6 shown as a asterisk). Euclidean distance=40

Figure 5D:
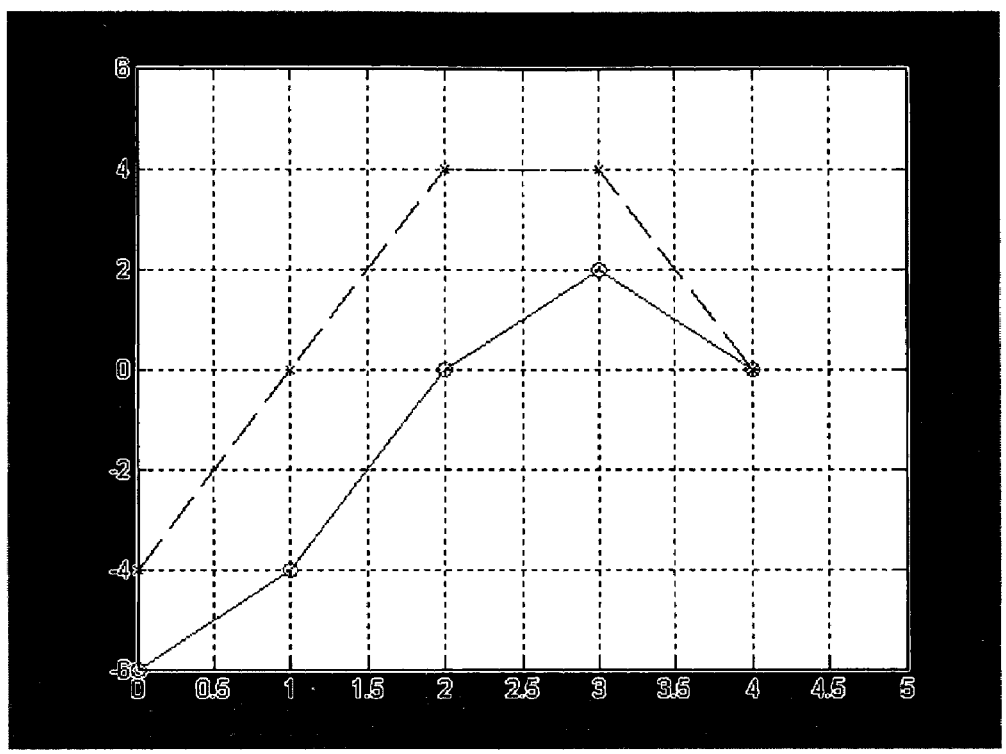

FIG. 5d: P6 (−6 −4 0 2 0 shown as a circle) and Q3 (−4 0 4 4 0 shown as a asterisk). Euclidean distance=40

Figure 6:
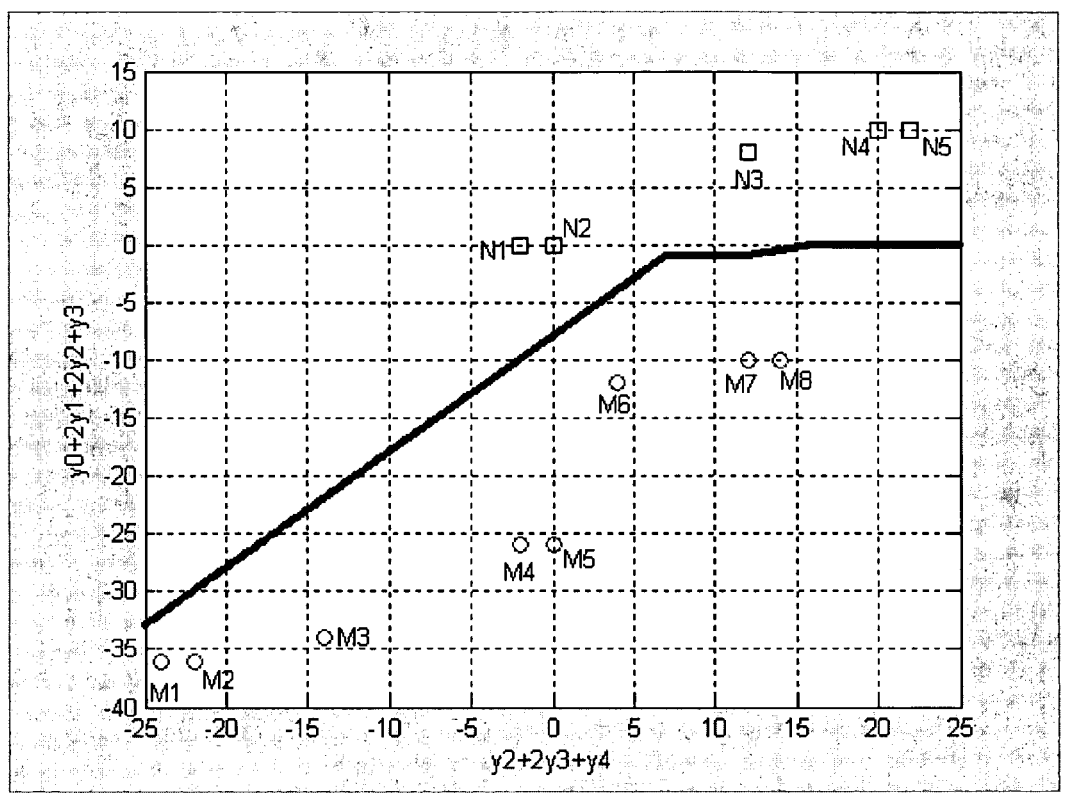
FIG. 6 shows decision boundary plots for a zero state of the detector using ideal target values.

From FIG. 6, the conditions are derived under which P4, P5, P6, P7, P8 and P9 are separated from Q group. It must be noted in the graphs of FIGS. 6, 8, 10 and 11 that the graphed variables M and N, correspond to the equation variables P and Q respectively. For example, if the mean squared error for P6 over the five-sample time is less than that for Q2, P6 is selected. This means that the next state is 0 instead of 1. Such conditions are referred to here as boundary decisions, mentioned above, as shown in the following:

(1) If Fa=y0+2y1+y2−y3−y4<=−8 or Y−X<=−8 where Y=y0+2y1+2y2+y3 and X=y2+2 y3+y4, P6 is selected over Q2.

(2) If Fd=Y<=0, P7 is selected over Q4.

(3) If Fd=Y<=0, P8 is selected over Q5.

(4) If Fb=Y<=−1, P6 is selected over Q3.

(5) If Fc=y0+2y1+1.76y2+0.512y3−0.244y4<=−3.93, an optimum separation of Q3 from P7 and P8 is achieved. These functions are those generated by the function generator 30 of FIG. 2.

In FIG. 6, it is noted that the boundary of Y=−1 is optimum for the pair of P6 and Q3 while Y=0 is optimum for the pairs of P7-Q4 and P8-Q5. Therefore, it is needed to derive another boundary to separate Q3 from P7 and P8 for maximum margin.

(1) If Fa=y0+2y1+y2−y3−y4<=−8 or Y−X<=−8 where Y=y0+2y1+2y2+y3 and X=y2+2 y3+y4, P6 is selected over Q2.

(2) If Fd=Y<=0, P7 is selected over Q4.

(3) If Fd=Y<=0, P8 is selected over Q5.

(4) If Fb=Y<=−1, P6 is selected over Q3.

(5) If Fc=y0+2y1+1.76y2+0.512y3−0.244y4<=−3.93, an optimum separation of Q3 from P7 and P8 is achieved.

Such an additional boundary is obtained by defining two points in FIG. 6 such that the distance from Q3 and P7 is 9 to the intersection with Y=−1 while the distance of Q3 to the second point where it meets with Y=0 is 9 as well. The minimum distance from Q3 to the combined boundary is turned out to be 8.75.

Figure 7:
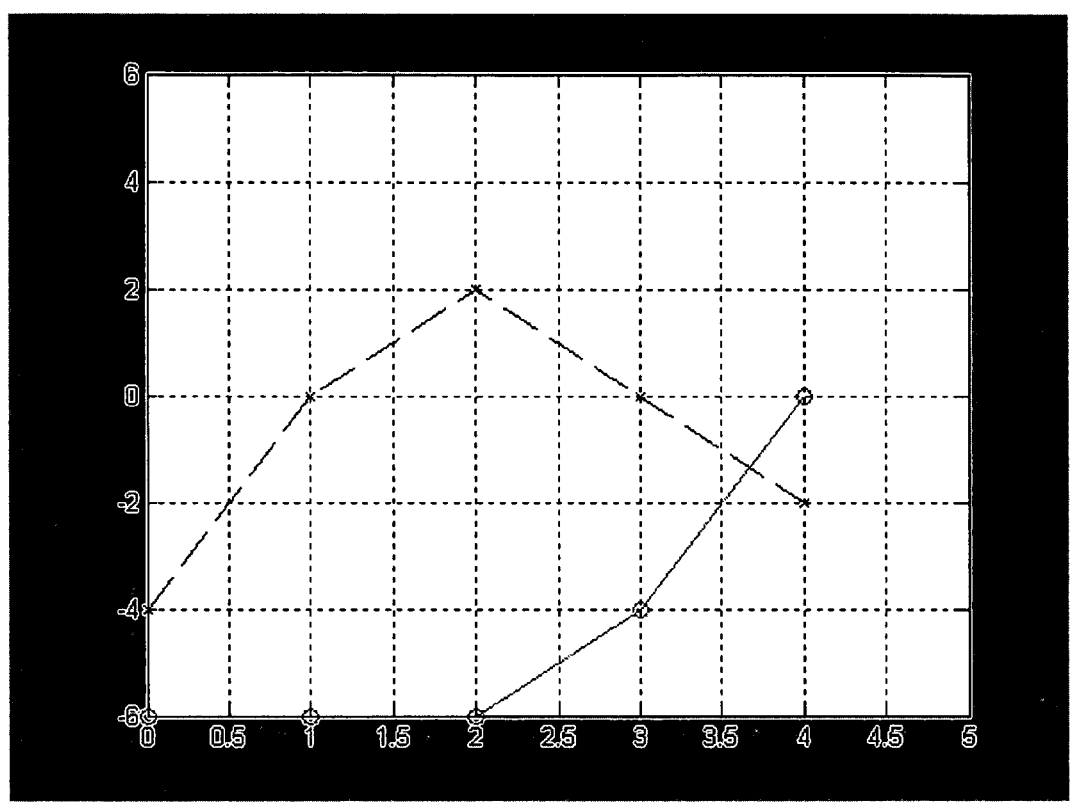
FIG. 7 shows a bottom envelope check pair for a zero state.

In order to derive the boundary for separating P1, P2 and P3 from Q group, Table 1 is revisited where P3 and Q2 has the minimum distance among all the permutations of all paths in Q group and a subset of P group, P1, P2 and P3. This pair of P3 and Q2 is shown in FIG. 6 from which the boundary function, Fd and the corresponding boundary logic variable, D are derived as below:

Y+X=−25;   0;   Fd=y0+3y1+4y2+2y3−y4<=−25; D=(Fd<=−25);

Since P3 can be characterized as part of the bottom envelope of the signal, the decision associated with this pair is called, "bottom envelope check." This is shown in FIG. 7.

Figure 8:
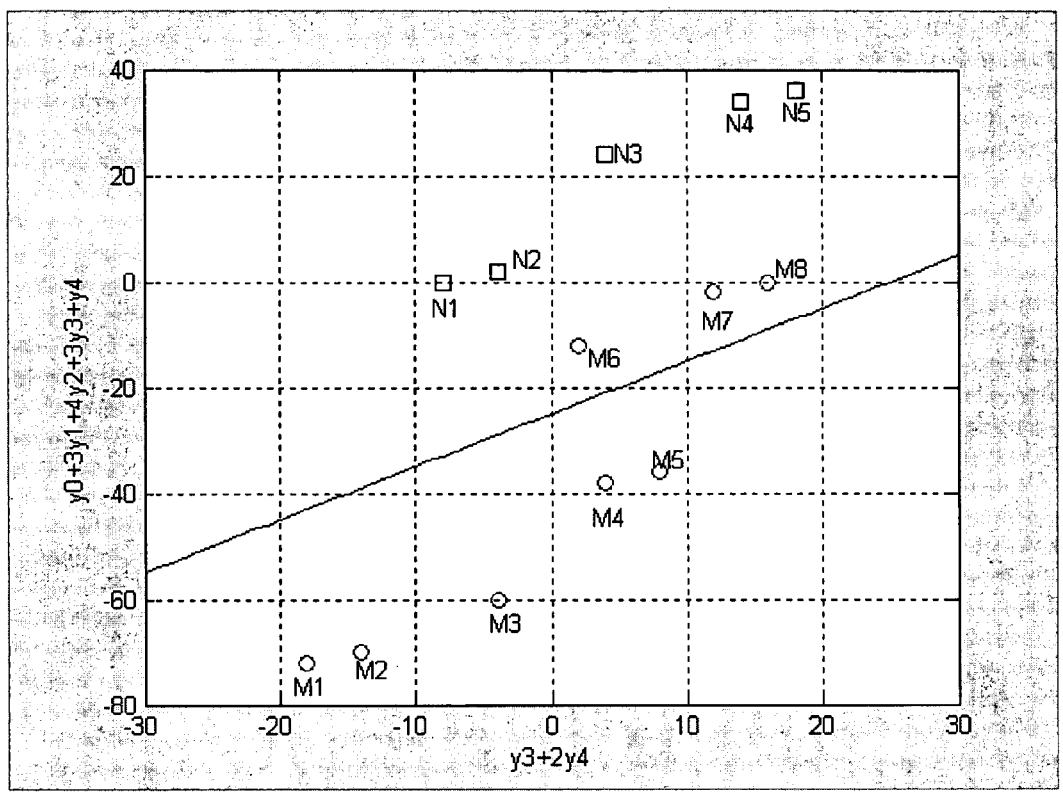
FIG. 8 shows a bottom check decision boundary plot for a zero state using ideal target values.
Figure 9:
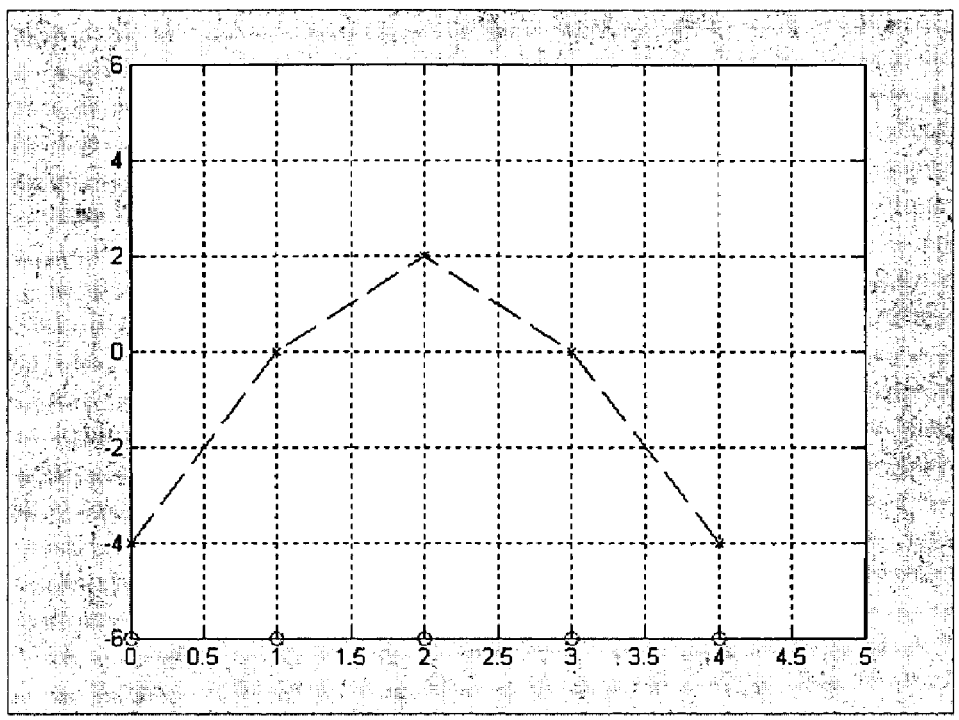
FIG. 9 shows another bottom envelope check pair for a zero state to find another boundary.
Figure 10:
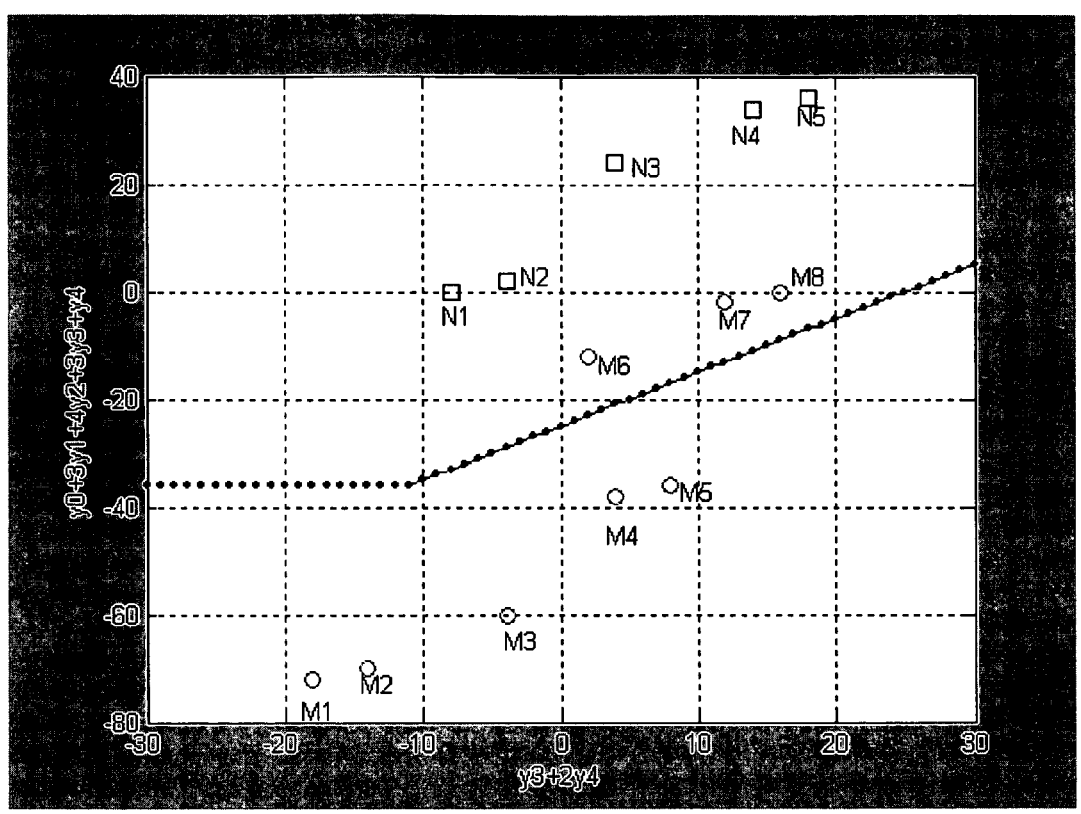
FIG. 10 shows a plot of the combined bottom check decision boundary plot for the pairs in FIGS. 7 & 9.
Figure 11:
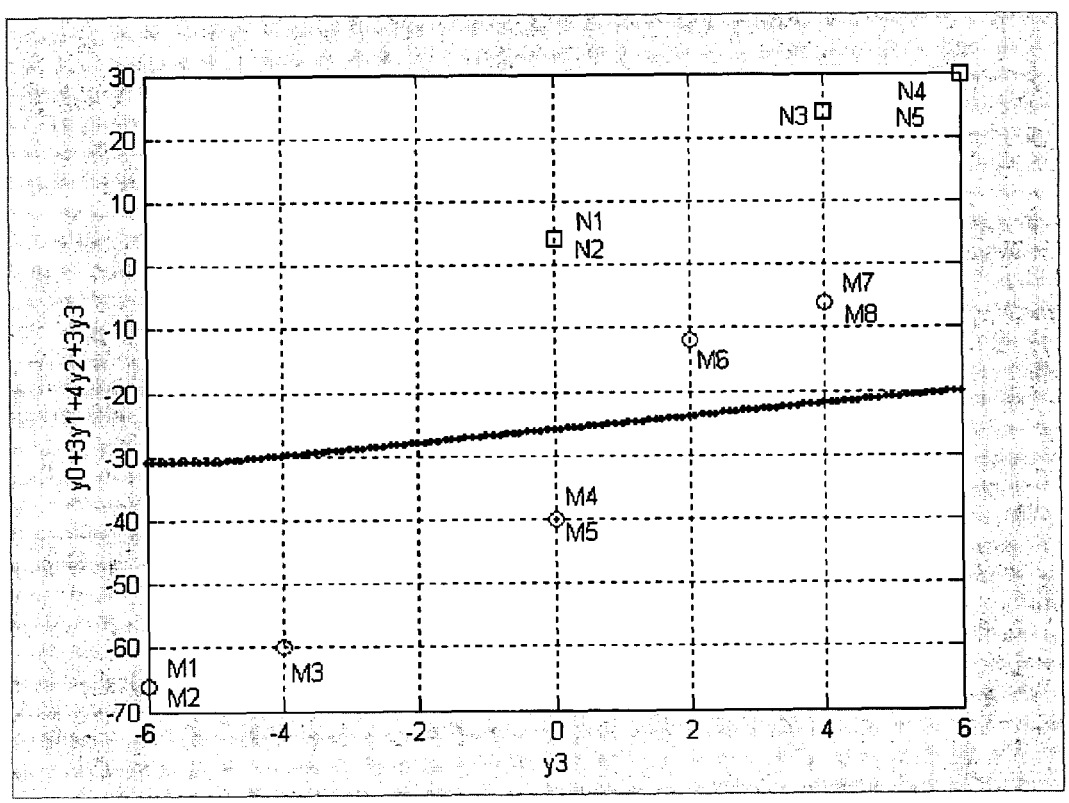
FIG. 11 shows a boundary plot is generated from FIG. 9 without using the y4 samples in FIGS. 7 and 9.

In FIG. 8, the boundary function separating P and Q groups are shown. It is noted from FIG. 8 that P1 becomes closet to the boundary among P1-P3 indicating a new boundary function is required for more margin for P1. Therefore we look at P1 and Q1 pair as shown in FIG. 9. From this pair, a new boundary function is generated and combined with FIG. 8, resulting in FIG. 10. Since P3 and P1 can be characterized as bottom envelope signals, we can ignore y4 samples from these two pairs to increase the margin as seen in FIG. 11.

Table 2 summarizes the boundary functions and the corresponding logic variables discussed above for state 0. These are the boundary functions generated by the function generator 30 of FIG. 2.

TABLE 2

Summary of boundary conditions for state 000 (0)

| Decision Boundary Functions | Nominal Decision Boundary Thresholds at state 000 (0) | Boolean Function R2 = AB + ACD + E + F |
|---|---|---|
| Positive Transition Check | | |
| Fa = y0 + 2y1 + y2 − y3 − y4 | A = (Fa <= −8) | Choose |
| Fb = y0 + 2y1 + 2y2 + y3 | B = (Fb <= −1) | P4-P8 over Q1-Q5 |
| Fc = y0 + 2y1 + 1.76y2 + 0.512y3 − 0.244y4 | C = (Fc <= −3.93) | if |
| Fd = y0 + 2y1 + 2y2 + y3 | D = (Fd <= 0) | AB + ACD = 1 |
| Bottom Envelope Check | | |
| Fe = y0 + 3y1 + 4y2 + 2y3 | E = (Fe <= −26) | Choose |
| Ff = y0 + 3y1 + 4y2 + 3y3 | F = (Ff <= −31) | P1-P3 over Q1-Q5 if E + F = 1 |

Similarly, the boundary functions and the corresponding boundary decision logic can be obtained for state 4 as for state 0 described earlier. Table 3 summarizes the same for state 4 as in Table 2 for state 0.

TABLE 3

Summary of boundary conditions for state 100 (4)

| Decision Boundary Functions | Nominal Decision Boundary Thresholds at state 100 (4) | Boolean Function R1 = AB + ACD + E + F |
|---|---|---|
| Positive Transition Check | | |
| Fa = y0 + 2y1 + y2 − y3 − y4 | A = (Fa <= −6) | Choose |
| Fb = y0 + 2y1 + 2y2 + y3 | B = (Fb <= 1) | P4-P8 over Q1-Q5 |
| Fc = y0 + 2y1 + 1.76y2 + 0.512y3 − 0.244y4 | C = (Fc <= −1.93) | if |
| Fd = y0 + 2y1 + 2y2 + y3 | D = (Fd <= 2) | AB + ACD = 1 |
| Bottom Envelope Check | | |
| Fe = y0 + 3y1 + 4y2 + 2y3 | E = (Fe <= −24) | Choose |
| Ff = y0 + 3y1 + 4y2 + 3y3 | F = (Ff <= −29) | P1-P3 over Q1-Q5 if E + F = 1 |

Returning to FIG. 4, there are four states to which the boundary decisions can lead which are: states 0 (000), 1 (001), 6 (110) and 7 (111) as shown in the figure. But there are only two out of these four states which contain the NRZI transitions: state 1 (001) and state 6 (110) where 1 and 0 represent the NRZ levels, i.e. "1" means HIGH and "0" means LOW.

The decoded output is generated at these two states such as:

D0=(~a0)(~b0)(c0)+(a0)(b0)(~c0)

Previously, the logic was derived for the next state given a current state as shown in Tables 2 and 3.

Figure 12:
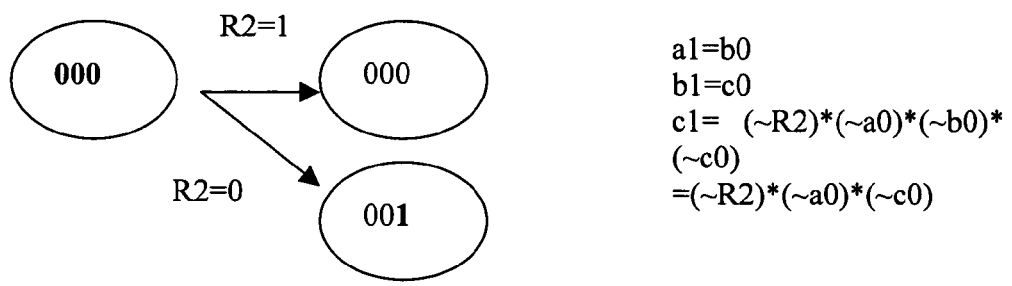
FIG. 12 shows one embodiment of combinational logic for a next state from the zero state.

FIG. 12 shows the transitions from state 0 to states 0 and 1. The next state a1b1c1 is readily obtained from the current state a0b0c0 and boundary decision variable, R2, provided by the boundary decision module 32 of FIG. 2.

For positive transition phase at state a0b0c0=000, a1=b0, b1=c0 and c1=(~R2)*(~a0)*(b0)*(c0). c1 can be reduced further to (~R2)*(~a0)*(c0)

because if a0=0 and c0=0 then b0 must be 0 due to d=1 constraint.

Figure 13:
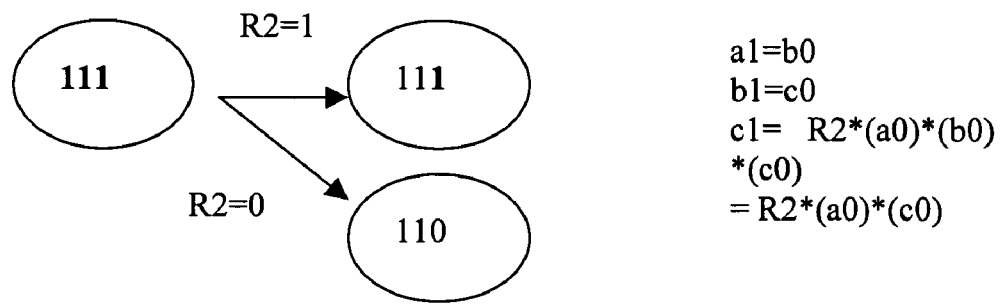
FIG. 13 shows one embodiment of combinational logic for next state given a seven state.

Similarly, the next state is determined for the state 7 which is the image of the state 0 as shown in FIG. 13:

a1=b0, b1=c0, c1=(R2)*(a0)*(b0)*(c0)=(R2)*(a0)*(c0)

Figure 14:
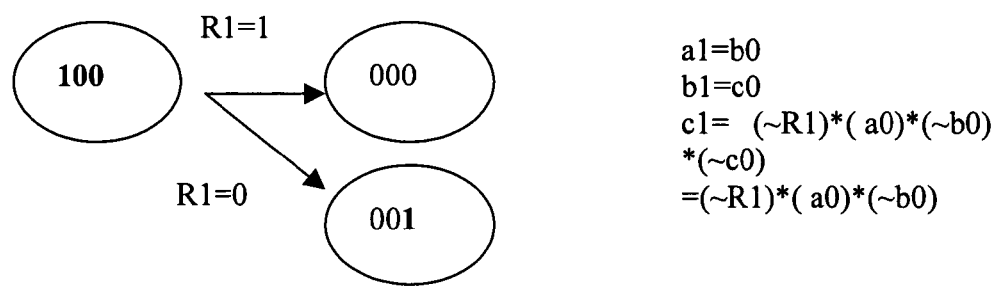
FIG. 14 shows one embodiment of combinational logic for a next state given a four state.
Figure 15:
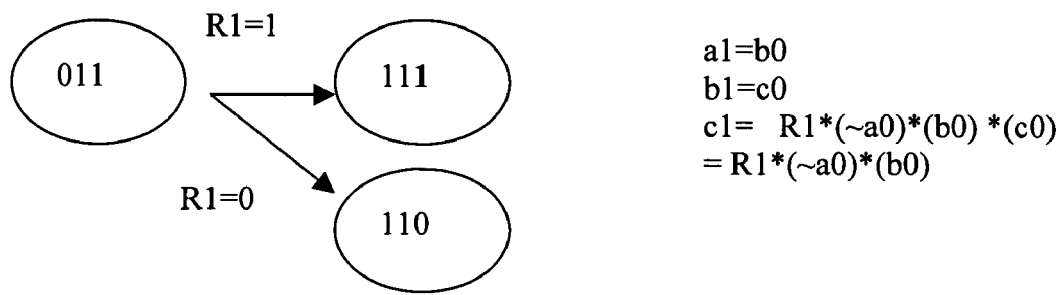
FIG. 15 shows combinational logic for next state given a three state.
Figure 16:
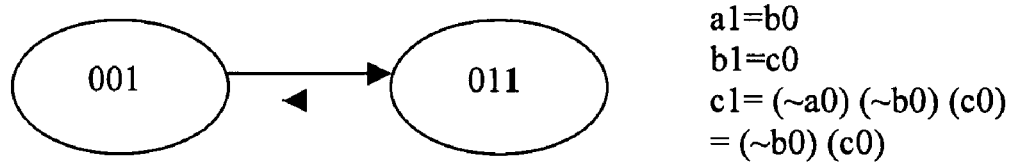
FIG. 16 shows an embodiment of combinational logic for next state given a one state.

Similarly, the next state is determined for the state 4 which is the image of the state 3 as shown in FIG. 14:

Combining the equations for both states 4 and 3, we obtain, a1=b0
b1=c0
c1=d0
d1=(~R1)(a0)(~b0)+R1(~a0)(b0)

For unconditional branch from state 1 to state 3, the next state bits are determined as shown in FIG. 14:

a1=b0
b1=c0
c1=(~a0)(~b0)(c0)=(~b0)(c0)

Combining all the equations above for all states, the next state bits are determined as below:

a1=b0
b1=c0
c1=(~b0)(c0)+R2(~a0)(~c0)+(~R2)(~a0)(~c0)+R1(~a0)(b0)+(~R1)(a0)(~b0)

Table 4 summarizes the results for decoder output as well as Boolean equations for next state.

TABLE 4

| | |
|---|---|
| Decoder Output | D0 = (~a0) (~b0) (c0) + ( a0) ( b0) ( ~c0) |
| Next State | a1 = b0 |
| | b1 = c0 |
| | c1 = ( ~b0)( c0) + R2(a0)(c0) + (~R2)(~a0)(~c0) + R1(~a0)(b0) + (~R1)( a0)(~b0) |

For a given branch defined from current state to next state, the sample value can be predicted. This can be used to monitor the quality of the invention in terms of rms error that can be readily calculated from this detected sample value given a received sample value.

Table 5 shows the combinational logic for sample value detection for each target sample level in terms of the boundary decision variables and the current state bits.

TABLE 5

| Conditions | Detected Sample Values |
|---|---|
| R2(~a0)(~b0) (~c0) = R2(~a0)(~c0) | −6 |
| (~R2) (~a0)(~b0) (~c0) + (R1) (a0)(~b0) )(~c0) = (~R2) (~a0)(~c0) + (R1) (a0)(~b0) | −4 |
| (~R1) (a0) (~b0)(~c0) = (~R1) (a0)(~b0) | −2 |
| (~a0)(~b0) (c0) + (a0)(b0) (~c0) = (~b0)(c0) + (b0)(~c0) | 0 |
| (~R1) (~a0) (b0)( c0) = (~R1) (~a0)( b0) | +2 |
| (~R2) (a0)( b0) (c0) + (R1) (~a0)( b0)( c0) = (~R2) (a0)( c0) + (R1) (~a0)( b0) | +4 |
| R2(a0)( c0) | +6 |

Using the equations given in Tables 4 and 5, it is helpful to reconsider the embodiment of the invention shown in FIG. 2. The function generator 30 generates the functions for the boundaries summarized in Tables 2 & 3. The boundary decision module 32 implements the combinational logic to generate the decisions, R1 and R2 described in Tables 2 and 3. The next state detector 34 determines the next state as well as detects the data using the information in Table 4. The sample value detector 36 detects the sample value from a given current state and its corresponding decisions. This detected sample value is used to monitor the quality of the decoding process in terms of the rms error.

Figure 17:
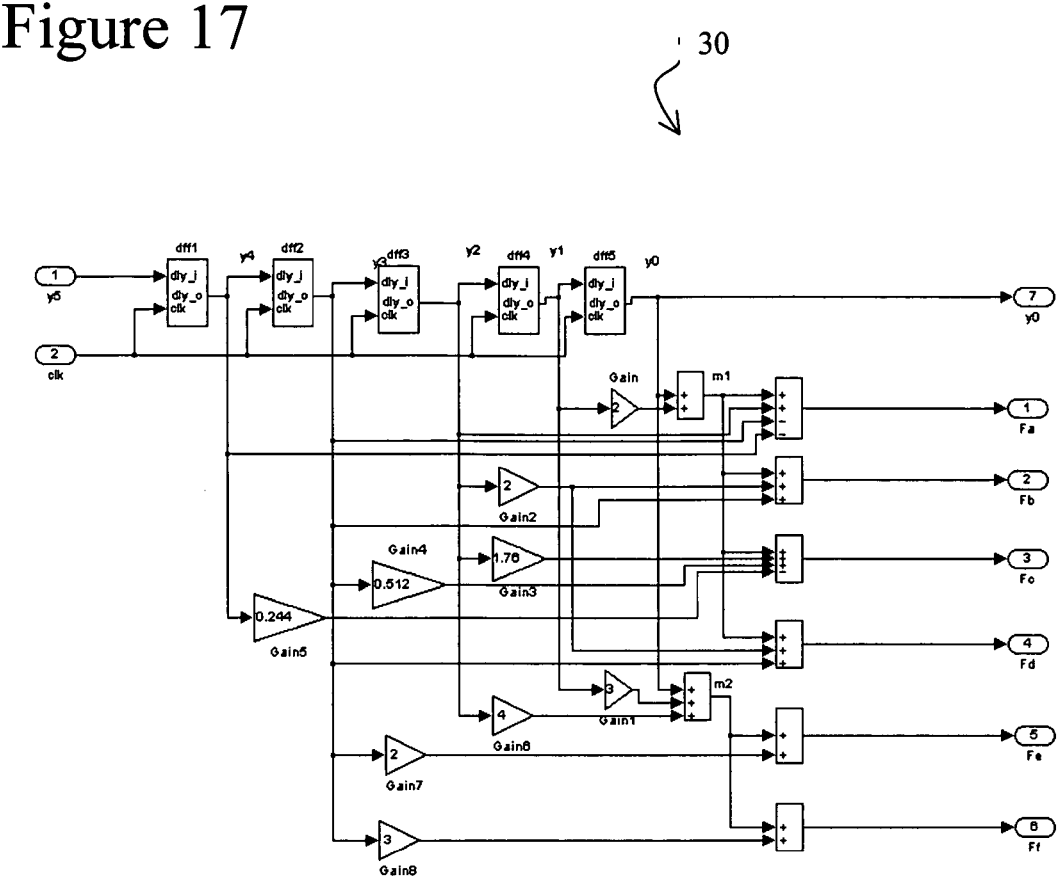
FIG. 17 shows an embodiment of a linear function generator for boundaries

In FIG. 17, one embodiment of the function generator 30 in FIG. 2 is shown where the linear functions for the boundaries summarized in Tables 2 and 3 are outputted from a sample received. The samples y0-y5 are separated by the delays dff1 through dff5. The separated samples then have gain applied to them and they are combined using the arithmetic units such as m1 and m2. The result is the boundary functions discussed in detail above.

Figure 18:
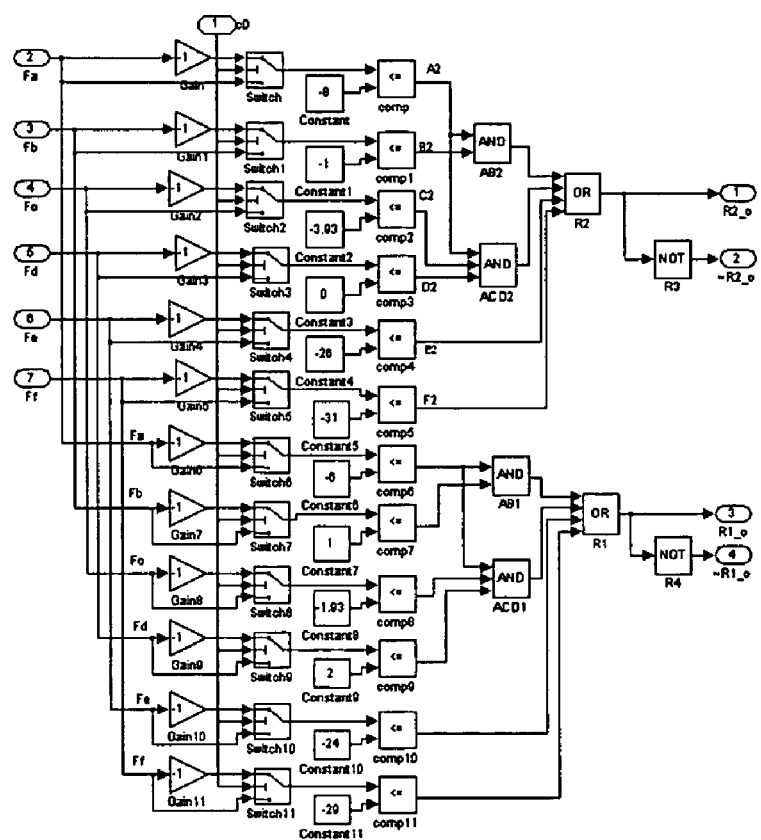
FIG. 18 shows an embodiment of a boundary decision block
Figure 19:
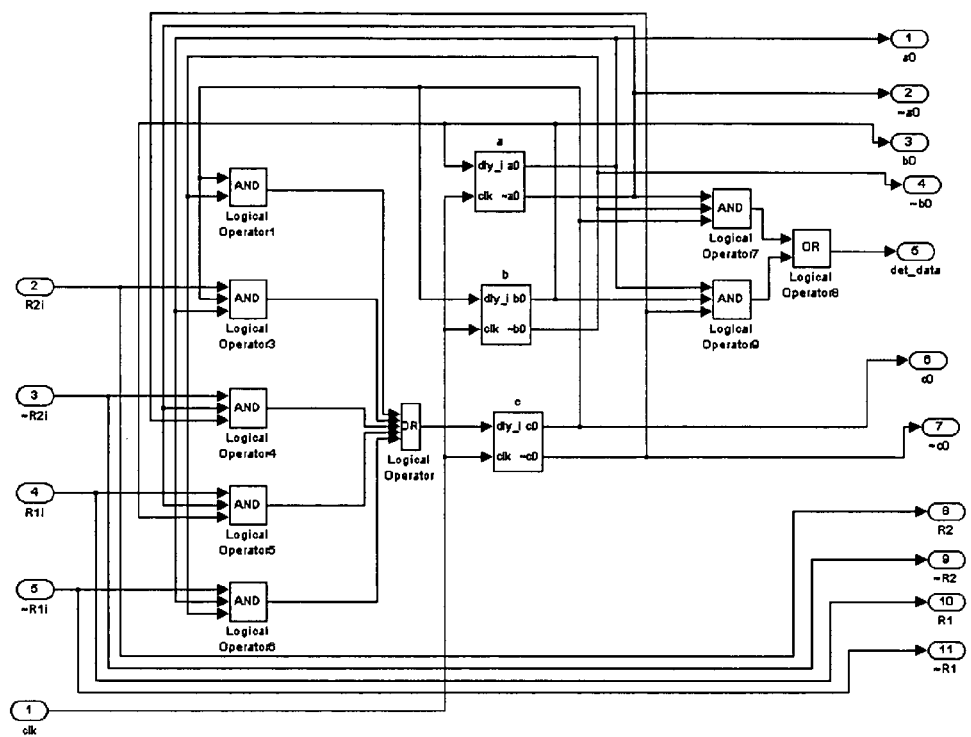
FIG. 19 shows an embodiment of a next state and decoder output generator

In FIG. 18, one embodiment of the boundary decision module 32 in FIG. 2 is shown where the boundary function values are compared with the constants that are programmable. The functions Fa-Ff are processed through a series of switches and gain stages to derive the values for the components of the R2 and R1 decision outputs. The individual variables from the functions, such as A, B, C, etc., are compared against constants. The default values for these constants are derived using the target ideal sample values for a given PR polynomial. During pre-manufacturing test, more accurate values can be obtained using the statistics of the sample value distribution from the drive under test. Then the default values will be replaced with such values to improve the performance of the decoding process described in the invention. In FIG. 19, an embodiment of the next state detector 34 in FIG. 2 determines the next state as well as the data is decoded from boundary decisions of R1 and R2 from Tables 2 and 3. The decision outputs R1 and R2 are used to determine the next values of a0, b0 and c0, by AND-ing them with the current values of a0, b0 and c0. For example, at the AND gate Logical Operator 3, the current value of c0 from delay c is AND-ed with R2 and the current value of a0 from delay a. These are all used to determine the next state of the detector based upon the bits a0, b0 and c0. In addition, the current values a0, b0 and c0 are used to produce the detected data value det_dat from the AND gates Logical Operators 7 and 9 and the OR gate Logical Operator 8.

It should be noted here that the speed of the invention is limited only by the two levels of logic, AND-OR while the PRML Viterbi detector is limited by the operation so called Add-Compare-Select (ACS) that is well known for having a speed bottleneck. Because of such ACS bottleneck, a parallel design is required for a high-speed application, resulting in hardware complexity. The advantage of the invention is quite obvious in this regard.

Figure 20:
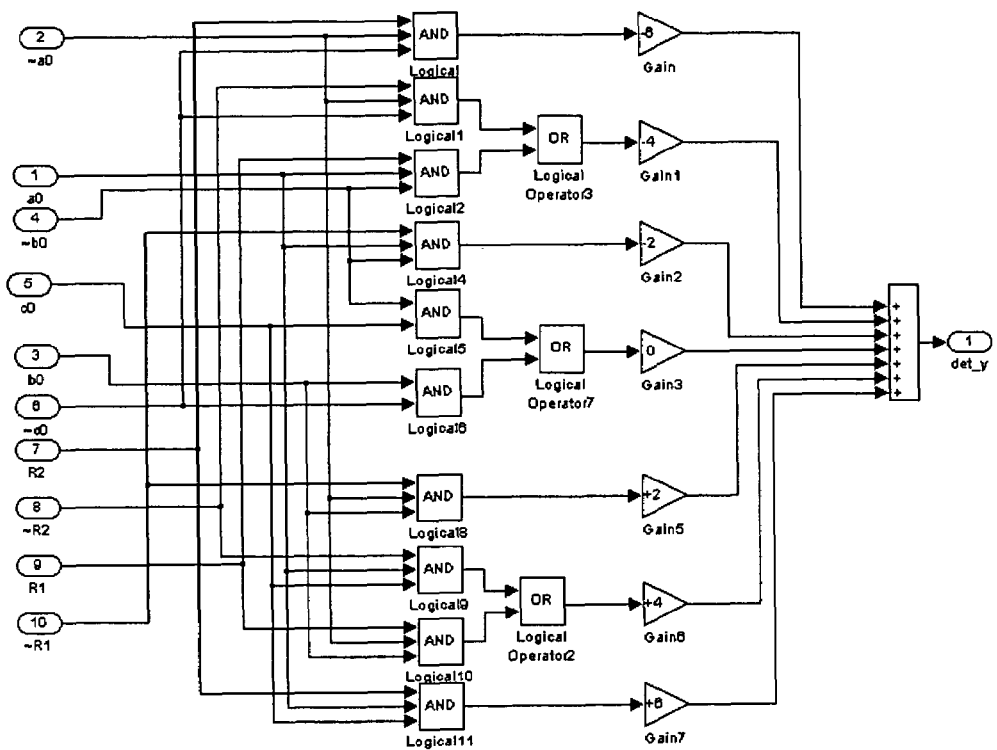
FIG. 20 shows an example of a detected sample value generator for RMS error channel quality block

In FIG. 20, one embodiment of the sample value estimator 36 in FIG. 2 is shown where the sample value is detected from the current state of the bits a0, b0 and c0 and the boundary decisions of R1 and R2 using a two-stage combinational logic approach. Various combinations of the data values and their inverses are AND-ed together at a first stage, and the resulting values are OR-ed at a second stage. Gain is then applied and the results are combined to produce the detected sample value det-y.

As discussed above, the detected sample value is used to calculate the rms error at 38 in FIG. 2 to monitor the quality of the invention in the real time. Such real time error monitor is often called in the industry, "channel quality." The results of the embodiments of the invention are compared in terms of the bit error rate (BER) with the conventional data slicer, such as one shown in FIG. 21.

The input pattern is random such that each section has all possible wavelengths once in a random order. From the input pattern, the analog waveform is generated using the well-known cosine channel model whose parameters are adjusted to produce 10% resolution. The resolution is defined as the ratio of the shortest wavelength peak to the longest wavelength peak.

Figure 21:
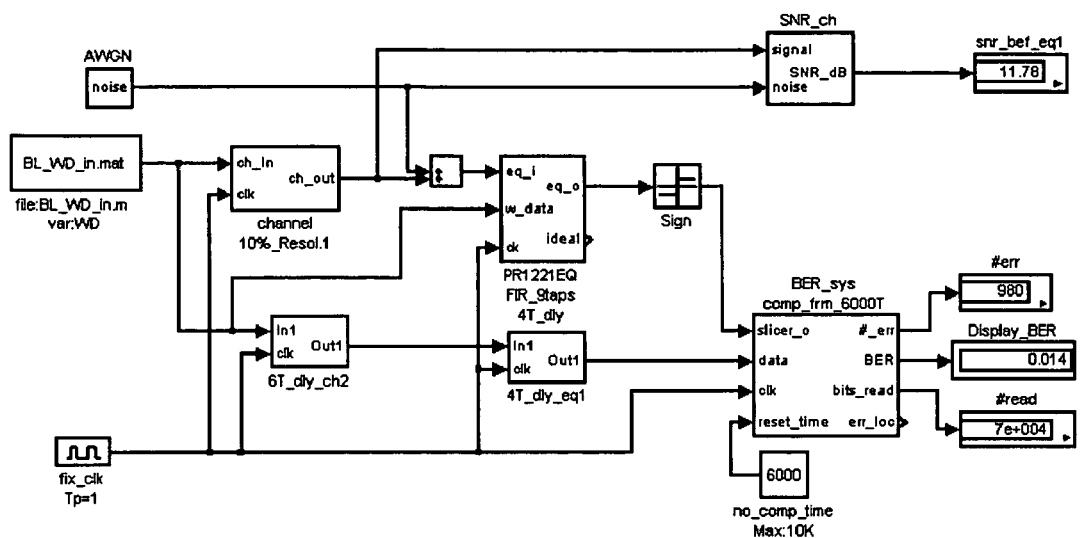
FIG. 21 shows an embodiment of a BER simulator for a data slicer
Figure 22:
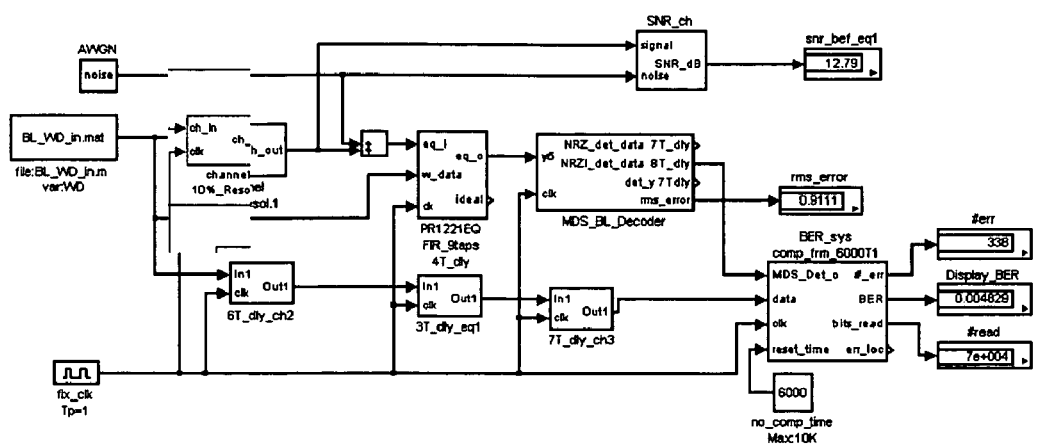
FIG. 22 shows an embodiment of a BER simulator in accordance with embodiments of the invention.
Figure 23A:
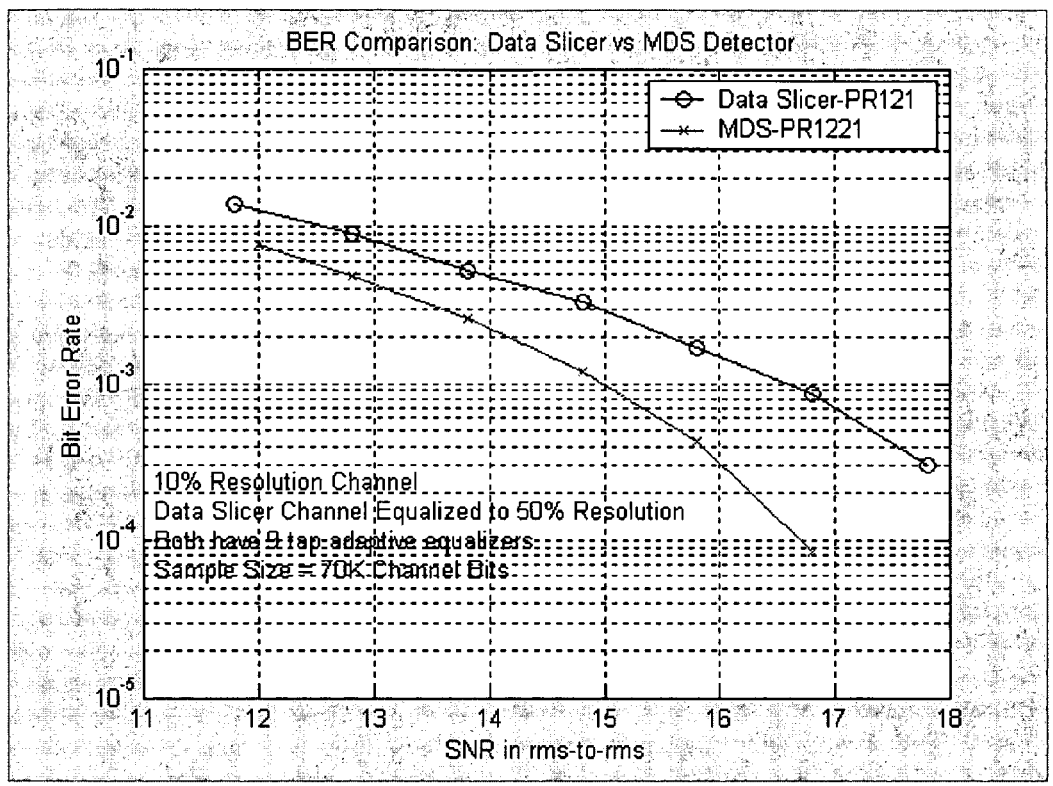
FIGS. 23a and 23b shows a graph of BER vs. SNR for the channels under comparison.
Figure 23B:
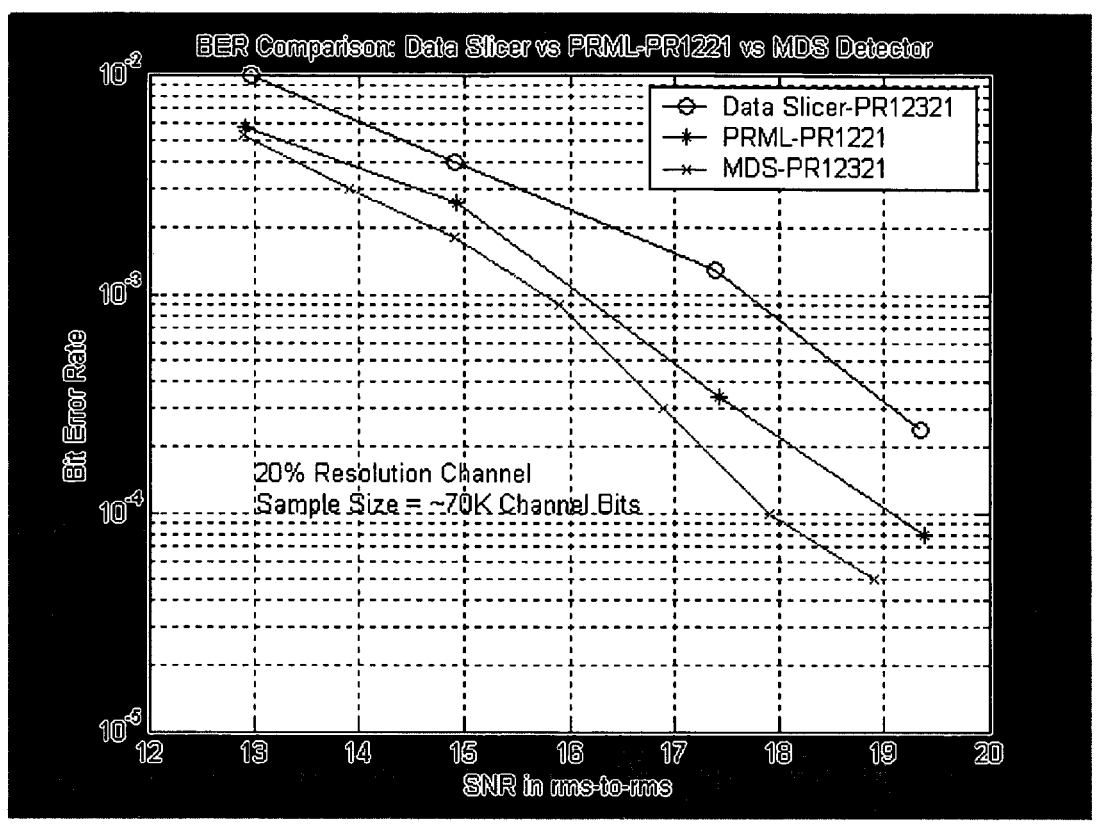

In FIG. 21, the data slicer model uses a 9-tap adaptive equalizer as in the embodiment of the invention shown in FIG. 22, which ensures that the comparisons in FIGS. 23a and 23b are comparing like values. The embodiments of FIG. 21 and FIG. 22 are versions of what would be analogous to the rms error circuit 38 or FIG. 2. The embodiment of FIG. 22 is the one that directly corresponds for embodiments of this invention. The embodiment of FIG. 21 is one that would be used in the prior art approaches to detection.

In FIGS. 23a and 23b, which are graphical representations of the performance of the two options, it is clearly shown that the embodiment invention performs better. It is noted here that since the sample size is only 70,000 bits read, the BER data in high SNR range is not accurate but still good enough for relative comparisons. For example, the invention is error free at 20 dB SNR for this sample size.

As mentioned previously, the advantage of the invention comes from the fact that it allows to use a higher order polynomial to minimize high frequency noise boost due to equalization.

What is claimed is:

1. A system, comprising:
    a light source to direct light to an optical disc;
    an optical pick up unit to receive light reflected back from the disc;
    a data detector to determine a data state from the light reflected back from the disc and to generate a digital data stream, the data detector comprising:
        a linear function generator to receive a pickup signal sensed from the optical disc, store at least one sample value to produce a delayed sample value and to generate a boundary function value;
        a boundary decision module to generate decision outputs;
        a next state detector to determine a next state and a detected data state; and
        a sample value detector to detect a sample value; and
        a channel quality monitor to generate an error from a comparison between inputs of the output of the sample value detector and the delayed sample value from the function generator.

2. The system of claim 1, wherein the optical disc further comprising a compact disc.

3. The system of claim 1, wherein the optical disc further comprises a digital video disc.

4. The system of claim 1, the system comprising an equalizer to boost a pickup signal.

5. The system of claim 1, the system comprising a digital signal processor to operate upon the digital data stream.

6. The system of claim 1, wherein the linear function generator further comprises a boundary function generator coupled to receive the pickup signal sensed from the optical disc and output the boundary function value.

7. The system of claim 1, wherein the boundary decision module further comprises boundary decision logic including a set of comparators to compare the boundary function values with programmable register values and to receive the output of the linear function generator and a combinational logic to generate decision outputs.

8. The system of claim 1, wherein the next state detector further comprises combinational logic to generate next state and detected data including an input coupled to receive the decision outputs of the boundary decision module and to output the next state and detected data.

9. The system of claim 1, wherein the sample value detector further comprises combinational logic to generate the detected sample value including inputs coupled to receive the outputs of the boundary decision module and an output of detected sample value coupled to an input of an rms error generator.

* * * * *

UNITED STATES PATENT AND TRADEMARK OFFICE
CERTIFICATE OF CORRECTION

PATENT NO. : 7,515,517 B2 Page 1 of 1
APPLICATION NO. : 10/836607
DATED : April 7, 2009
INVENTOR(S) : Gene Ho Sonu It is certified that error appears in the above-identified patent and that said Letters Patent is hereby corrected as shown below:

Column 1, line 44, the words "a real" should read -- areal --;
Column 5, line 48, the word "yO" should read -- y0 --;
Column 9, line 17, the words "R2(~a0)(~c0)" should read -- R2(a0)(c0) --.

Signed and Sealed this

Fifteenth Day of September, 2009

David J. Kappos
*Director of the United States Patent and Trademark Office*